US012801662B2

(12) United States Patent
Kumar et al.

(10) Patent No.: US 12,801,662 B2
(45) **Date of Patent: *Nov. 17, 2026**

(54) CONTEXT-BASED ORGANIZATION OF DIGITAL MEDIA

(71) Applicant: Adobe Inc., San Jose, CA (US)

(72) Inventors: Rotish Kumar, Telangana (IN); Arshla Jindal, Nodia (IN); Abhishek Shah, Delhi (IN)

(73) Assignee: Adobe Inc., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 19/019,110

(22) Filed: Jan. 13, 2025

(65) Prior Publication Data

US 2025/0148006 A1 May 8, 2025

Related U.S. Application Data

(63) Continuation of application No. 16/591,913, filed on Oct. 3, 2019, now Pat. No. 12,216,704.

(51) Int. Cl.
*G06F 16/583* (2019.01)
*G06F 16/538* (2019.01)
(Continued)

(52) U.S. Cl.
CPC .......... *G06F 16/583* (2019.01); *G06F 16/538* (2019.01); *G06F 16/54* (2019.01); *G06F 16/5866* (2019.01); *G06F 16/587* (2019.01)

(58) Field of Classification Search
CPC ........ G06F 16/538; G06F 16/54; G06F 16/55; G06F 16/583; G06F 16/5866;
(Continued)

(56) References Cited

U.S. PATENT DOCUMENTS 10,242,034 B1 * 3/2019 Li ....................... G06F 16/4393
2002/0088010 A1 * 7/2002 Dudkiewicz ............ G06F 16/40
725/38

(Continued)

OTHER PUBLICATIONS

Ahsan, U., Sun, C., Hays, J., & Essa, I. (Mar. 2017). Complex event recognition from images with few training examples. In 2017 IEEE Winter Conference on Applications of Computer Vision (WACV) (pp. 669-678). IEEE.

*Primary Examiner* — James E Richardson
(74) *Attorney, Agent, or Firm* — Shook, Hardy & Bacon L.L.P.

(57) ABSTRACT

Embodiments of the present invention provide systems, methods, and computer storage media for organization of digital media in which a digital media gallery is organized based on underlying events or occasions by leveraging content tags associated with media. Content tags and their corresponding confidence scores for a set of media are compared with correlation scores of content tags with certain event types. Upon receipt of a set of media, candidate event types may be determined based on content tags associated with the set of media and relevant tags for different event types. The candidate event types are scored based on the confidence scores and the correlations scores for each candidate event type. The highest scoring candidate event type may be presented to the user as the event type for the set of media.

20 Claims, 10 Drawing Sheets

(51) Int. Cl.

| | |
|---|---|
| ***G06F 16/54*** | (2019.01) |
| ***G06F 16/58*** | (2019.01) |
| ***G06F 16/587*** | (2019.01) |

(58) Field of Classification Search

CPC ...... G06F 16/587; G06F 16/65; G06F 16/683; G06F 16/686; G06F 16/7867; G06F 16/787

See application file for complete search history.

(56) References Cited

U.S. PATENT DOCUMENTS

| | | | | |
|---|---|---|---|---|
| 2009/0091798 | A1* | 4/2009 | Lawther | G06F 16/58<br>358/3.28 |
| 2009/0177670 | A1* | 7/2009 | Grenier | G06F 16/9535 |
| 2009/0319472 | A1* | 12/2009 | Jain | G11B 27/34 |
| 2010/0111428 | A1 | 5/2010 | Yu et al. | |
| 2013/0202210 | A1* | 8/2013 | Ryoo | G06V 20/52<br>382/195 |
| 2014/0093174 | A1* | 4/2014 | Zhang | G06F 16/5854<br>382/190 |
| 2015/0006545 | A1* | 1/2015 | Das | G06F 16/435<br>707/748 |
| 2021/0011940 | A1* | 1/2021 | Tang | G06F 16/535 |

* cited by examiner

CONTEXT-BASED ORGANIZATION OF DIGITAL MEDIA

CROSS-REFERENCE TO RELATED APPLICATIONS

This application is a continuation application of U.S. application Ser. No. 16/591,913, filed Oct. 3, 2019, entitled "Context-Based Organization of Digital Media," which is expressly incorporated herein by reference it its entirety.

BACKGROUND

With the proliferation in the number of channels (e.g., cell phones, portable cameras, laptops, tablets) on which digital content (e.g., images, videos, animations) is created and consumed, organizing the content in an easy to understand, contextual manner has become of utmost importance. Increasing use of portable and convenient devices with sensors (e.g., cameras) to capture and store digital media has allowed users to collect a vast amount of media. A variety of computer-implemented media storage and organization technologies exist to assist users in storing and organizing digital media in their devices. Over time, users have increasingly larger collections of digital media on personal devices. Typically, with existing media solutions, users have to manually organize their media into manually created albums. Specifically, a user is required to manually create albums and add media to each album. Manually labeling albums can become increasingly cumbersome as the collection becomes larger. Often, users either forget the labeling scheme or stop organizing altogether. Manually organizing media can be cumbersome and time consuming.

SUMMARY

Embodiments of the present invention are directed to a context-based digital media organization system to efficiently and accurately organize a digital media gallery based on underlying events or occasions represented in the media. In this regard, a user may input a digital media gallery with a collection of media. The media gallery may be divided into sets of media based on time and/or date stamps associated with each media in the digital media gallery. Content tags and corresponding correlation scores may be determined for each possible event type. The correlation scores may indicate likelihood that corresponding content tags represent the event type. Each media of the set of media may be associated with at least one of the content tags determined for an event type. A confidence score for each media may be determined to correspond to a likelihood of the content tag being relevant to that media. Event candidate scores for the set of media may be generated for some or all of the possible event types. The event candidate scores may be determined based on the correlation scores of the content tags and the confidence scores for each of the media of the set of media. The highest ranking event type may be presented to the user in conjunction with the set of media. As such, a user can be efficiently and effectively provided with an organized gallery with each set of media being presented with an event type describing an underlying occasion or event represented in the respective set of media. This enables the user to easily delineate relevant information about the underlying media without having to visually search through the entire gallery to find images from an occasion or event.

BRIEF DESCRIPTION OF THE DRAWINGS

The present invention is described in detail below with reference to the attached drawing figures, wherein.

DETAILED DESCRIPTION

Overview

Figure 1:
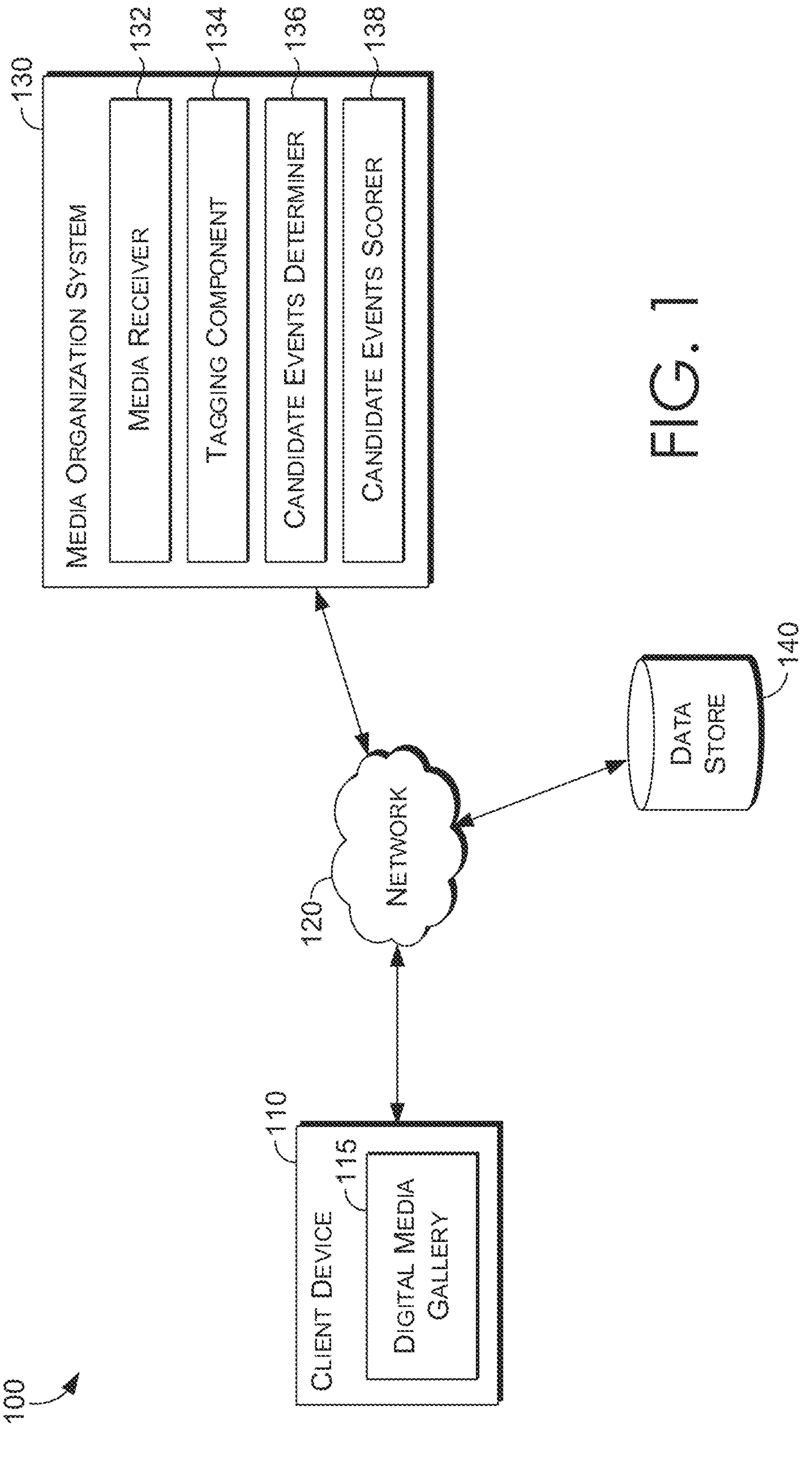
FIG. 1 is a block diagram of an exemplary environment suitable for use in implementing embodiments of the invention, in accordance with embodiments of the present invention.

Conventional media organizing algorithms are typically used to organize media based on date stamps and/or locations gathered using a global positioning system of a device to divide media into associated albums. The albums are named based on the date and time stamp on each media. However, conventional media organization algorithms lack the ability to detect events or occasions (e.g., festivals, graduations, birthdays, weddings) associated with particular digital media. Further, the conventional algorithms are unable to provide content-based information for the media.

Specifically, conventional media organization systems utilize date and time stamps to organize digital media (e.g., images, videos, animations). Typically, these conventional systems organize digital media solely by dates. However, these conventional systems fail to recognize multiday events. Further, these systems depend solely on day and time stamps without regard to the origins of the media. For example, when a media is downloaded from the cloud or received from another user via an application (e.g., messages, email, WhatsApp, etc.), the day or time stamp associated with the media may not be accurate. In such examples, the media will be stored or organized in association with an inaccurate date due to the system's dependency on date and time stamps. Additionally, conventional systems fail to provide contextual information regarding the organization scheme. Some conventional media organization systems additionally use a device's location (e.g., global positioning system location) information to organize the media based on both date and location. Because of the conventional systems' dependency on date and location, the accuracy of the organization is entirely dependent on the device's date and GPS accuracy, and are susceptible to inaccurate organization. Further, as noted, conventional systems especially fail at recognizing multiday events. There is a need for an accurate and informative organization algorithm to organize digital media to provide context to the media organization such that it is easy for a user to understand and navigate an extensive digital media collection.

Embodiments of the present invention address the technical problem of accurately organizing digital media based on context without extensively relying on media's date and location accuracy. In embodiments, a context-based digital media organization system includes an algorithm that may be used to predict event types (e.g., festivals, birthdays, weddings, trips, graduations, etc.) for each set of digital media that may be used as a title to contextually organize a digital media gallery stored in a device or in cloud. The present system may be trained to recognize and leverage content tags in digital media to determine an event represented by the particular media. In contrast to conventional systems that only use data stamps and GPS locations associated with media for organization, the present system predicts events represented by a set of media based on contextual information leveraged from the media. The present system thus allows for a more robust and contextual manner of predicting events within digital media that can then be used for informatively and accurately organizing digital media.

In some examples, for any received media (e.g., image, video, animation), content tags may be generated for each media. Any known algorithm or model may be used to assign content tags for media. Content tags classify content (e.g., objects, characteristics) in a media. Each tag for a media may also be associated with a confidence score that indicates a likelihood that the tag is relevant to the associated media. These confidence scores may be used to determine whether and to what extent a particular content tag in a given media should be used to categorize the media to an event type (e.g., festivals, birthdays, graduations, weddings, trips, etc.). This improves the analytical accuracy of the present system.

Further, a machine learning model may be used to learn a set of relevant tags for each event type. These relevant tags are learned using a training dataset of tagged images to learn tags that are common across media of same event types. For example, the relevant tags for event type "wedding" may include wedding, bride and groom, etc. The relevant tags for event type "birthday" may include birthday, cake, balloon, etc. The relevant tags for event type Christmas may include Christmas, date tags between December 24 and December 26, etc. Further, correlation scores for each tag for the corresponding event are also learned. Since certain event types share relevant but overlapping tags, a correlation score of a tag with respect to an event type indicates a likelihood of a given media representing the event type due to a presence of the tag in the media. For example, a cake may be a relevant tag for both event types, birthdays and weddings, but a correlation score for a cake for a birthday may be different from that for a wedding. The higher the correlation score for a tag, the more relevant the tag is to that particular event type. Learning correlation scores of tags to an event type may reduce false detection of event types that may occur due to media including a content tag that is common across multiple event types. Using correlation scores for tags with respect to corresponding event types to later determine the most likely event type corresponding to a set of media allows the present system to take into account contextual information when making the determination. A database may store correlation scores for each tag with respect to a corresponding event type.

In some embodiments, input media is received by a media organization system from a digital media gallery of a client computing device. The media in the digital media gallery may be filtered based on date and time stamps associated with each media. The input media may be divided into sets of media such that each set includes media with date and time stamps that are temporally close to one another. Each set of media may then be contextually analyzed to determine an event type (e.g., festivals, birthdays, weddings, trips, graduations) associated with each set. The set of input media may include tags associated with each frame and/or image of the input media. Each tag may also include a corresponding confidence score associated with the tag and the corresponding frame and/or image. Candidate event types may then be determined by comparing the tags associated with the set of input media with relevant tags for each possible event type. In some examples, an event type may be determined to be a candidate event type if a threshold percentage of frames and/or images of the set of input media includes tags that match the relevant tags for that event type. For example, for "wedding" to be a candidate event type, at least 20 percent of the media in the set should include tags, such as wedding, bride, and groom, relevant to the event type "wedding." In this way, outlier tags may be ignored, and false positives and false negatives may be reduced. In some other examples, an event type may be determined to be a candidate event type if the tags associated with the set that match the relevant tags for that event type cover at least a threshold portion of the relevant tags for that event type. For example, for "wedding" to be a candidate event type, the set should include at least three tags for the event type wedding, such as wedding, bride, and groom. In this way, outlier tags may be ignored, and false positives and false negatives may be reduced. This is possible as event types with only a few relevant tags detected in the set may be dismissed from consideration, and similarly, event types with relevant tags detected in only a few frames and/or images may be dismissed from consideration as well. Further, this increases the efficiency of the system as certain event types may be dismissed from consideration early on, saving the computing power for more relevant candidate event types.

For each candidate event type, an event candidate score may be determined. The event candidate score for a candidate event type may be based on the confidence scores for each tag in the set of input media and the corresponding correlation scores with respect to the candidate event type. The candidate event type with the highest event candidate score may be selected as the event type for the set. The selected event type may be presented to a client device as a title for the media set. In some examples, a collage with the set of input media and the title including the selected input title may be generated and presented to a user. In another example, an animation with the selected event type as a title and including each of the frames and/or images in the set may be generated and presented. In one more example, an album with the selected event type as the title may be generated and presented with the frames and/or images from the set included within the album. In this way, the gallery may be organized intelligently to show event types associated with each set of media such that the users may easily perceive the context behind each set.

In another embodiment, the present system may take a generic to specific approach to detecting an event type for an underlying set of input media. The set of input media may be analyzed to determine whether the set represents a category of event types based on the tags associated with the set of input media. This may be done by comparing the tags of the set of input media to relevant tags (e.g., party, celebration, birthday, cake, balloon, wedding, groom, bride, Christmas, gift, candles, decoration, ceremony, anniversary, reception, etc.) for a category of event types and determining whether an event candidate score for a category of event types for the set is higher than a threshold. The category of event types may encompass multiple event types. The categories may be holiday events, life events, travel events, sports events, etc. In some examples, a set of input media is determined to represent a category when two or more relevant category tags are found to match tags in a threshold percentage of the set of input media.

In response to the media set representing a category of event types, the present system may then test the set of input media one event type at a time within that category using the event candidate score for each event type against a threshold. For example, for an event category type, "life events," an event candidate score may be calculated for an event type being "wedding." If the event candidate score for the set representing "wedding" is higher than a predetermined threshold, "wedding" may be selected as the event type. If, on the other hand, the event candidate score for the set representing "wedding" is lower than the threshold, an event candidate score may be calculated for "birthday," and so on. In this way, the present system saves computational power by stopping the analysis once an event candidate score for a particular event type is found to be higher than a threshold. As such, the set of input media may not be tested against all possible candidate event types within the category of event types. In one embodiment, this approach may be used to validate the results of the overall approach of testing the input media against each candidate event type. This allows the system to accurately detect events or occasions based on contextual information present in the media.

Aspects of the technology disclosed herein provide a number of advantages over previous solutions. For instance, one previous approach involves organizing media based on date stamps and GPS locations of the client device when the media was captured and/or received by the client device. However, that approach does not take into account contextual information present in the media to intelligently organize digital media in a user-friendly and meaningful way. Further, the previous approach assumes that the date and time stamps are always accurate, leading to false organization, especially when media is received from another source and does not belong with the set that was captured by the device itself. That prior approach is also constricted to acknowledging and presenting rudimentary information without consideration of the content of the media itself, unable to provide useful information about the media it contains.

To avoid such constraints on the present system, embodiments of the technology described herein, for instance, systematically employ an algorithm(s) to recognize and utilize content tags in media and relevant tags for individual event types to generate context-specific organization schemes for media. Unlike the conventional systems, the embodiments of the present technology only leverage the date stamps and locations as one consideration while leveraging content tags of the media to further refine the organization scheme to present relevant information about the underlying media to the users such that users can easily delineate the media that represents certain event types versus others. Embodiments of the present technology may allow for accurate and efficient determination of underlying events and/or occasions for a set of digital media by using an algorithm to determine tags relevant to a candidate event type that is specifically selected in order to reduce false negatives and false positives due to outlier images and tags in a set of media.

Digital Media Organization Environment

Referring now to FIG. 1, a block diagram of exemplary environment 100 suitable for use in implementing embodiments of the present invention is shown. Generally, environment 100 is suitable for facilitating digital media organization, and among other things, facilitates a context-based organization of a digital media galley by determining and displaying an event type associated with each set of media received in the media gallery.

Environment 100 includes a network 120, a client device 110, and a media organization system 130. In the embodiment illustrated in FIG. 1, the client device 110 includes a digital media gallery 115. Generally, the digital media gallery 115 includes a collection of media and presents a context-based organization of a collection of media. The client device 110 can be any kind of computing device capable of facilitating presentation of context-based digital media organization. For example, in embodiments, client device 110 can be a computing device such as computing device 1000, as described below with reference to FIG. 10. In embodiments, client device 110 can be a personal computer (PC), a laptop computer, a workstation, a mobile computing device, a PDA, a cell phone, or the like. The components of environment 100 may communicate with each other via network 120, which may include, without limitation, one or more local area networks (LANs) and/or wide area networks (WANs). Such networking environments are commonplace in offices, enterprise-wide computer networks, intranets, and the Internet.

In FIG. 1, client device 110 includes the digital media gallery 115. The digital media gallery 115 may be incorporated, or integrated, into an application or an add-on or plug-in to an application. The application may generally be any application capable of facilitating a digital media organization, and may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Although generally discussed herein as the digital media gallery 115 being associated with an application, in some cases, the digital media gallery 115, or a portion thereof, can be additionally or alternatively integrated into the operating system (e.g., as a service) or a server (e.g., a remote server). In some examples, the digital media gallery 115 may be stored in a cloud computing environment.

The digital media gallery 115 of client device 110 may include a user interface or application allowing the user to store or submit media. Any suitable user interface and input component may be used, such as those described with respect to I/O components 1020 of FIG. 10. Various number and/or types of media may be received for organization. For example, the digital media gallery 115 can accept images, videos, animations, slideshows, and the like. In some embodiments, the digital media gallery 115 may receive a collection of media for organization. Generally, the digital media gallery 115 is in communication with the media organization system 130 via network 120, and may send the media or collection of media from the client device 110 to the media organization system 130 for processing. Although the collection of media is described as being sent to the media organization system 130, this need not be the case, as any or all of the components of the media organization system 130 may be located on the client device 110 or elsewhere.

The data store 140 stores a plurality of media and corresponding event types. In some examples, the data store 140 may include a repository of categories of event types (e.g., holiday events, life events, travel events, or sports events, etc.), particular event types (e.g., festivals, birthdays, weddings, trips, graduations) and corresponding correlation scores for tags in relation to the category of event types and/or the particular event types. The category of event types may encompass multiple event types. It should be noted that an event type may be included in multiple categories.

Each event type and/or category of event type may be associated with content tags and their corresponding correlation scores. Content tags classify content (e.g., objects, characteristics) in media. For example, objects may include cake, bride, groom, balloon, presents, etc., and characteristics may include Christmas, day, night, wedding, background, location, date, etc. A correlation score may correspond to a likelihood of a content tag representing an event type (or category of event types). Each content tag associated with an event type or a category of event type may have a corresponding correlation score. The correlation scores and corresponding content tags may be stored in an index in association with the category of event types and the event types. In some examples a machine learning model may be used to learn correlation scores for content tags with corresponding event types. Generally, machine models generate probabilities for content tags being relevant to the associated event type. As such, the correlation scores for content tags for an event type may be probabilities indicating a likelihood of the content tags being relevant to the associated event type. Correlation scores associated with a content tag may be different for different event types. Since certain event types share relevant but overlapping tags, a correlation score of a tag with respect to an event type indicates a likelihood of a given media representing the event type due to a presence of the tag in the media. For example, a correlation score for a “cake” content tag for a “birthday” may be different from that of the same tag for the event type “wedding.” The higher the correlation score for a tag, the more relevant the tag is to that particular event type. In some examples, each event type may include a correlation score for each content tag.

In some examples, the machine learning model may learn relevant content tags for each event type. The relevant content tags for an event type may be content tags that are common across various media sets of the same event type. These relevant tags are learned using a training dataset of tagged images used to train a machine learning model to learn content tags that are common across media of same event types. For example, the relevant tags for event type “wedding” may include wedding, bride and groom, etc. The relevant tags for event type “birthday” may include birthday, cake, balloon, etc. The relevant tags for event type Christmas may include Christmas, date tags between December 24 and December 26, etc. For each relevant content tag, a correlation score may be learned that indicates a likelihood of the content tag representing the associated event type. Similarly, correlation scores may be learned for each category of event type and corresponding content tags and/or relevant content tags. In some examples, content tags with a correlation score above a predetermined threshold may be considered relevant tags for the associated event type or category of event types. The content tags and/or the relevant content tags may be stored in the data store 140 in an index for each event type and/or category of event types. The machine learning model may also learn event types included in each category of event types. In some examples, the category of event types and associated event types may also be stored in the data store 140. In those examples, the correlation scores for each content tag and/or relevant content tag may be stored in the data store 140 in a hierarchical fashion, such that the event types and their corresponding correlation scores may be saved in an index under the corresponding category of event types and its corresponding correlation scores. It should be noted that correlation score for a content tag may be zero for an event type if the content tag is minimally related or completely unrelated to the event type.

Although examples are described herein with respect to using neural networks and specifically convolutional neural networks (CNNs) or deep neural networks (DNNs), as the machine learning model, this is not intended to be limiting. For example, and without limitation, the machine learning model of the present disclosure may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), computer vision algorithms, and/or other types of machine learning models.

Generally, the forgoing process can facilitate determination and presentation of an event type for a set of media in response to receiving a collection of media in a digital media gallery by using an algorithm to predict an event type associated with a set of media that leverages content tags in the media and the corresponding relationship of those content tags with event types to contextually organize a collection of media. By adopting such algorithms of the present disclosure to determine event types for each set of media, a collection of media may be organized in a contextual and intelligent way so as to provide a user with pertinent information regarding content of underlying media.

The media organization system 130 is generally configured to receive a collection of media and determine an event type for each set of media in the collection that best represents the set of media. The media organization system 130 may receive the collection of media from the digital media gallery 115 of the client device 110. In some examples, the media organization system 130 may be a part of the digital media gallery 115. In other examples, the media organization system 130 may be located on a remote server, such that digital media gallery 115 may communicate with the media organization system 130 via network 120. In the embodiments illustrated in FIG. 1, the media organization system 130 includes a media receiver 132, a tagging component 134, a candidate events determiner 136, and a candidate events scorer 138.

The media organization system 130 is generally configured to organize a collection of media into sets of media associated with corresponding event types. Specifically, the media organization system 130 may sort a collection of media into sets of media, and for each set of media, score event types to determine an event type most likely represented in the set of media. System 130 determines and scores candidate event types using tags associated with each media in the set of media. The media organization system 130 may use tags in the set of media matching tags relevant to the event types and their correlation with the event types to further score the candidate event types to determine a selected candidate event type to present to the client device 110.

The media receiver 132 may retrieve or obtain a collection of media from the digital media gallery 115 of client device 110. Upon obtaining a collection of media, the collection may be sorted based on date stamps associated with each media in the collection of media. In embodiments, the collection of media may be divided into sets of media such that each set includes media with date and time stamps that are temporally close to one another. In another example, the collection may be divided into sets of media further based on GPS location stamps associated with each media. In such an example, each set of media may include media with GPS location close to one another.

The tagging component 134 may generally be configured to determine content tags for each media. Each content tag may also include a corresponding confidence score associated with tag and the corresponding frame and/or image. Content tags classify content (e.g., cake, presents, decorations, Christmas, bride, groom, Santa, etc.) in the associated media. For example, the tagging component may detect and classify objects in the media, including cake, bride, groom, balloon, presents, etc. Similarly, the tagging component may detect and classify characteristics of a media, including, Christmas, day, night, wedding, background, location, date, etc. A machine learning model or features-based algorithm may be used to generate content tags and corresponding confidence scores for each media of the set of media based on features detected in the media. The machine learning model may be trained using tagged media as ground truth data. The tagging component 134 may use any known algorithm or machine learning model to perform content analysis and generate content tags and corresponding confidence scores for each media. Generally, content classification models generate probabilities for content tags detected in a media, the probabilities corresponding to confidence that the content tag is relevant to the media. The confidence score may be a probability that indicates a likelihood of the content tag being relevant to the associated media. In this way, confidence scores may provide importance information for each content tag in the set of media, allowing for contextual information to be associated with a set of media. In some examples, content tags may be classifications generated for each media. Any known classification technique or application, such as Haystack®, may be used to generate the content tags.

The candidate events determiner 136 may generally be configured to determine candidate (e.g., potential) event types for the obtained set of media by matching the content tags associated with the set of media with content tags relevant to event types. The candidate events determiner 136 may access the data store 140 to determine the content tags relevant to each event type of a plurality of event types, and use the relevant tags to further determine candidate event types that include, or may include, a meaningful event type for the set of media. These relevant tags may be learned using a training dataset of tagged images to learn tags that are common across media of same event types. For example, the relevant tags for event type "wedding" may include wedding, bride and groom, etc. The relevant tags for event type "birthday" may include birthday, cake, balloon, etc. The relevant tags for event type Christmas may include Christmas, date tags between December 24 and December 26, etc.

In some examples, the candidate events determiner 136 may determine an event type to be a candidate event type based on a threshold percentage of frames and/or images of the set of input media includes tags that match the relevant tags for that event type. For example, for "wedding" to be a candidate event type, at least 20 percent of the media in the set should include tags, such as wedding, bride, and groom, relevant to the event type "wedding." In this way, outlier tags may be ignored, and false positives and false negatives may be reduced. In some other examples, an event type may be determined to be a candidate event type if the tags associated with the set that match the relevant tags for that event type cover at least a threshold portion of the relevant tags for that event type. For example, for "wedding" to be a candidate event type, the set should include at least three tags for the event type wedding, such as wedding, bride, and groom. In this way, outlier tags may be ignored, and false positives and false negatives may be reduced. This allows event types with only a few relevant tags detected in the set to be dismissed from consideration, and similarly, event types with relevant tags detected in only a few frames and/or images to be dismissed from consideration as well. Further, reducing false results increases the efficiency of the system as certain event types may be dismissed from consideration early on, saving the computing power for more relevant candidate event types.

The candidate events determiner 136 may further determine correlation scores between each content tag associated with the set of media and the candidate event types. The correlation scores may be stored and retrieved from the data store 140. The correlation scores may indicate a likelihood of a content tag representing the corresponding event type. A content tag may have different correlation scores for different event types. Correlation scores for each tag for the corresponding event may also be learned using a training dataset of tagged images to learn tags that are common across media of same event types. Since certain event types share relevant but overlapping tags, a correlation score of a tag with respect to an event type may indicate a likelihood of a given media representing the event type due to a presence of the tag in the media. For example, a cake may be a relevant tag for both event types, birthdays and weddings, but a correlation score for a cake for a birthday may be different from that for a wedding. The higher the correlation score for a tag, the more relevant the tag may be to that particular event type. Learning correlation scores of tags to an event type may reduce false detection of event types that may occur due to media including a content tag that is common across multiple event types. Using correlation scores for tags with respect to corresponding event types to later determine the most likely event type corresponding to a set of media may allow the present system to take into account contextual information when making the determination. A database may store correlation scores for each tag with respect to a corresponding event type. The candidate event types may be determined by the candidate determiner 136 as described in more detailed below with respect to FIG. 2.

The candidate events scorer 138 may be generally configured to generate event candidate scores for each candidate event type based on the confidence scores and the correlation scores. For each candidate event type, an event candidate score indicating a likelihood of the set of media representing the corresponding candidate event type may be generated. An event candidate score, $ECS_i$, for an event type may be calculated using the following:

$$ECS_i = \frac{\sum(COS_i * CNS_i)}{\text{Total Media}}$$

where $COS_i$ is correlation score of a tag (also included in the content tags associated with a media of the set of media) with the candidate event type, $CNS_i$ is the confidence score of the same tag with the corresponding media in the set of media, and the total media is the total number of media in the set of media. The candidate events scorer 138 may select as an event type for the set of media the candidate event type with the highest event candidate score. Further details on determining the selected event type are described below with reference to FIG. 3.

As such, the event candidate scorer 138 is configured to rank the candidate event types based on a combination of the correlation scores of content tags of the candidate event types and the confidence scores of the same tags in the set of media to determine the event type to present to a user which is most likely represented in the set of media. The selected event type may be presented to via a user interface of the client device 110 as a title for the set of media within the digital media gallery 115. In some examples, a collage with the set of media and the title including the selected title may be generated and presented via the client device 110. In another example, an animation with the selected event type as a title and including each of the frames and/or images in the set of media may be generated and presented. In one more example, an album with the selected event type as the title may be generated and presented with the frames and/or images from the set of media included within the album. In this way, the digital media gallery 115 may be organized intelligently to show event types associated with each set of media such that the users may easily perceive the context behind each set of media.

Figure 2:
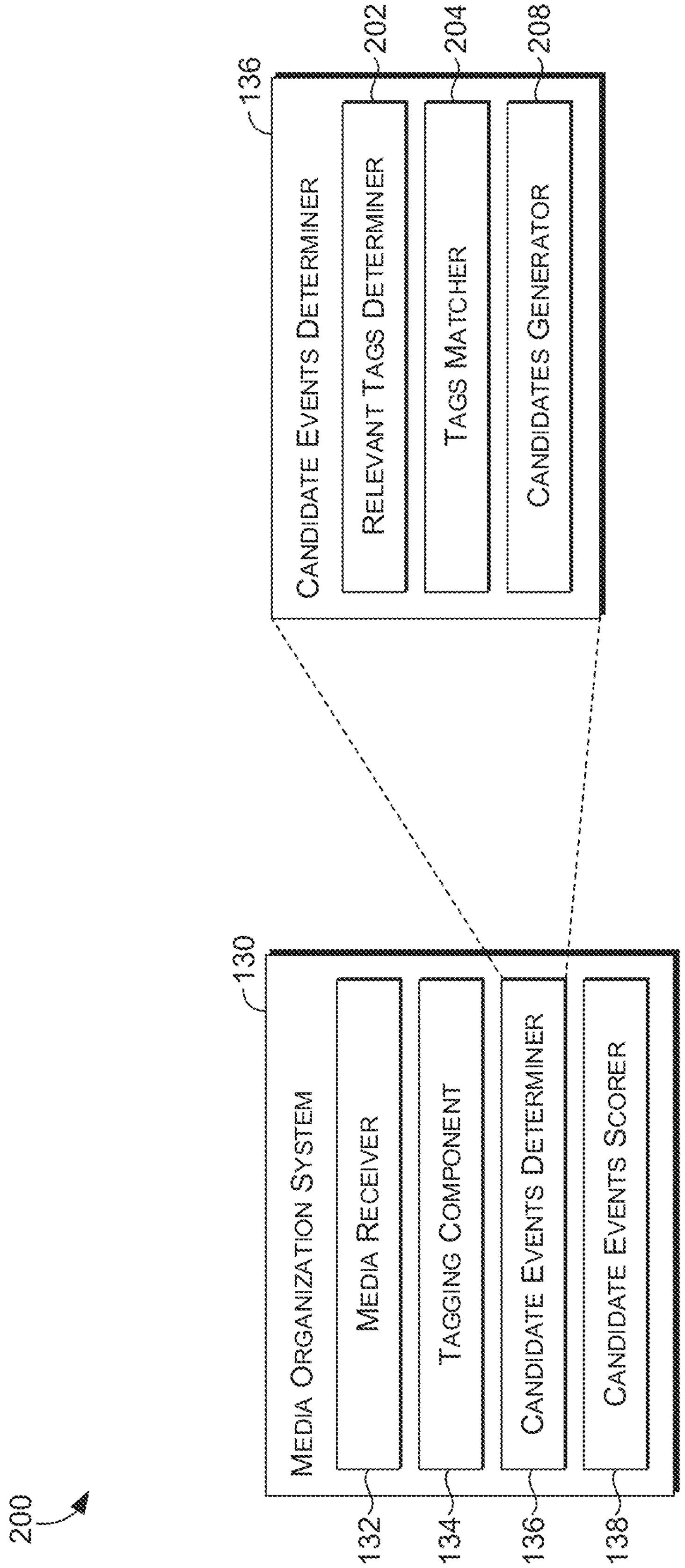
FIG. 2 illustrates an example candidate events determiner of a media organization system, in accordance with embodiments of the present invention.

Turning to FIG. 2, FIG. 2 illustrates an exemplary candidate events determiner 136 of the media organization system 130, in accordance with embodiments of the present invention. In some example embodiments, the candidate events determiner 136 of FIG. 1 may include, as shown in FIG. 2, a relevant tags determiner 202, a tags matcher 204, and a candidates generator 206. The candidate events determiner 136 may communicate with the data store 140 and the tagging component 134. The candidate events determiner 136 may be configured to determine one or more candidate event types that may be represented in the set of media. The correlation scores associated generated by tags matcher 204 with each content tag and an event type may be leveraged to determine candidate event types. In some examples, a predetermined number of candidate event types may be determined that may potentially be represented in the set of media. Determining candidate event types from all event types in the data store 140 may conserve computational power and increase efficiency of the system as only a limited number of event types may be ultimately tested against to determine the event type portrayed in a set of media.

The relevant tags determiner 202 may be configured to receive content tags associated with each event type from the data store 140. The relevant tags determiner 202 may receive an index associating each event type with content tags and corresponding correlation scores. In some examples, the relevant tags determiner 202 may receive, for each event type, a set of relevant content tags and their corresponding correlation scores from the data store 140. In this way, the system can more efficiently determine candidate event types by dismissing content tags not relevant to event types.

The tags matcher 204 is configured to determine tags matching the relevant content tags for each of the event types. The tags matcher 204 may obtain the event types and their corresponding relevant content tags from the relevant tags determiner 202. The tags matcher 204 may also obtain content tags determined for the set of media from the tagging component 134 of FIG. 1. For each event type, the tags matcher 204 may compare the content tags of the set of media with a set of relevant tags for that event type. The comparison may include a one-on-one matching between content tags matching the relevant tags for an event type. For example, for "wedding" event type, the content tags of the set of media may be matched against relevant tags "wedding," "groom," "bride," "cake," etc. The tags matcher 204 may keep a count of each relevant tag encountered in the content tags for the event type, and a count of the number of times the relevant tag is encountered in the set of media.

The candidates generator 206 is configured to determine the candidate event types for the set of media. The candidates generator 206 may be configured to obtain the matching relevant tags for each event type encountered in the content tags from the set of media from the tags matcher 204. In some examples, an event type may be determined to be a candidate event type if a threshold percentage of frames and/or images of the set of media includes content tags that match the relevant tags for that event type. For example, for "wedding" to be a candidate event type, at least 20 percent of media in the set should include content tags, such as wedding, bride, and groom, relevant to the event type "wedding." In this way, outlier tags may be ignored, and false positives and false negatives may be reduced. In some other examples, an event type may be determined to be a candidate event type if the tags associated with the set that match the relevant tags for that event type cover at least a threshold portion (e.g., three relevant tags) of the relevant tags for that event type. For example, for "wedding" to be a candidate event type, the set should include at least three tags for the event type wedding, such as wedding, bride, and groom. In this way, outlier tags may be ignored, and false positives and false negatives may be reduced. As noted previously, this allows event types with only a few relevant tags detected in the set to be dismissed from consideration, and similarly, event types with relevant tags detected in only a few frames and/or images to be dismissed from consideration as well. The candidates generator 206 may determine candidate event types that may be potentially portrayed in the set of media. In some examples, the candidates generator 206 may select a threshold number of event types as candidate event types based on the total number of matching content tags in the set of media as the relevant tags for each event type. Selecting candidate event types increases the efficiency of the system as certain event types may be dismissed from consideration early on, saving computing power for more relevant candidate event types.

Figure 3:
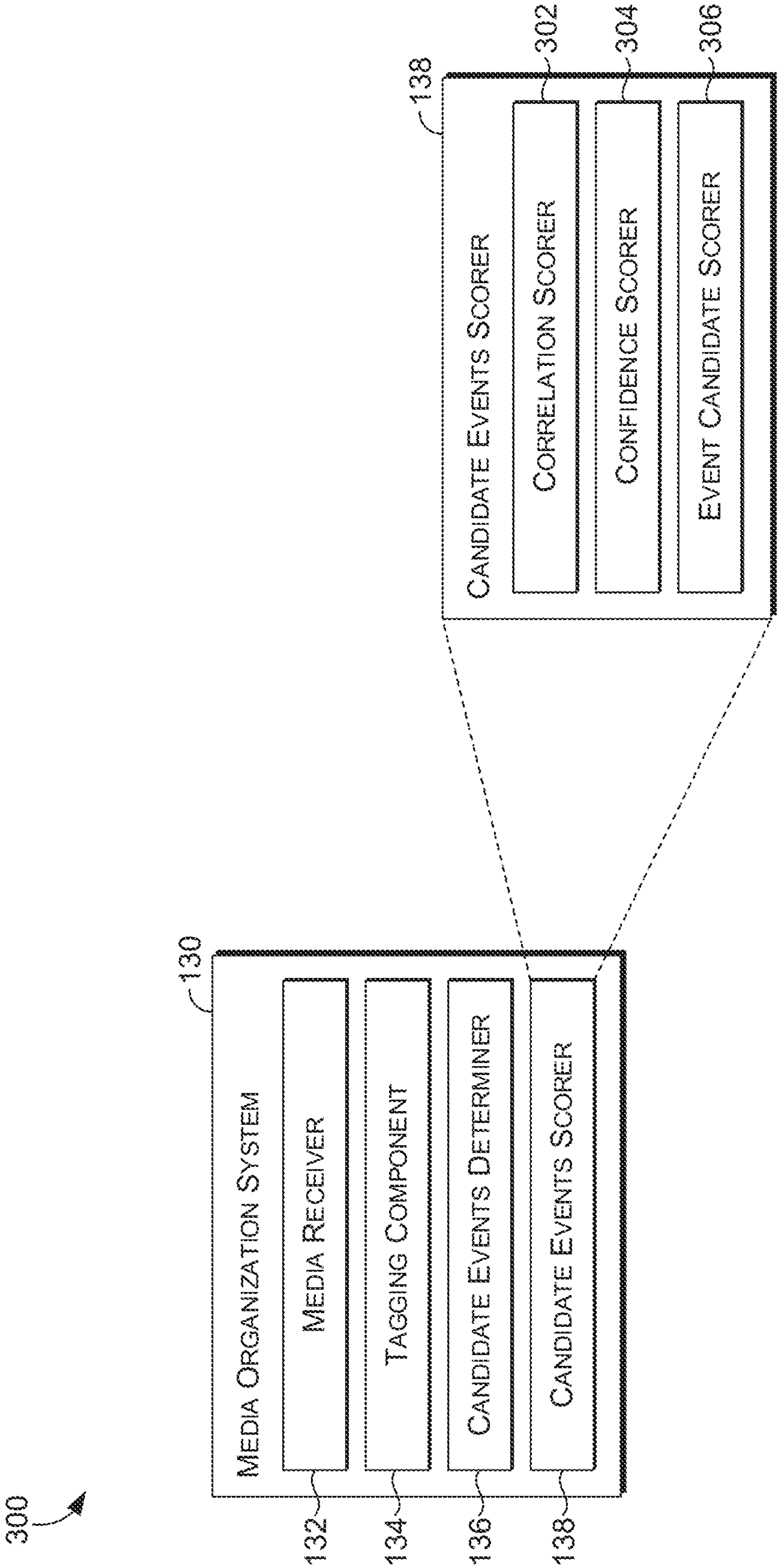
FIG. 3 illustrates an example candidate events scorer of a media organization system, in accordance with embodiments of the present invention.

Referring now to FIG. 3, FIG. 3 illustrates an example candidate events scorer 138 of a media organization system in accordance with embodiments of the present invention. In some exemplary embodiments, the candidate events scorer 138 of FIG. 1 may include a correlation scorer 302, a confidence scorer 304, and an event candidate scorer 306. The candidate events scorer 130 may determine event candidate scores for each candidate event type that indicates an overall likelihood of the set of media belonging to the corresponding candidate event type. The event candidate score for each candidate event type may be determined based on the correlation scores of the content tags with the corresponding candidate event type as well as the confidence scores of the same content tags with the set of media. The candidate event type with the highest event candidate score may be selected and presented as the event type represented in the set of media.

Returning to FIG. 3, the correlation scorer 302 may retrieve or obtain the candidate event types and their corresponding correlation scores associated with content tags from data store 140 of FIG. 1. The correlation scorer 302 may retrieve, from the data store 140, matching content tags for each candidate event type found in the content tags associated with the set of media as determined by the tags matcher 204 of FIG. 2. For each candidate event type, the correlation scorer 302 may obtain or retrieve correlation scores for each content tag in the set of media. In some examples, the correlation scorer 302 may only obtain correlation scores for each relevant content tag associated with corresponding candidate event type that matches with a content tag associated with the set of media.

The confidence scorer 304 is configured to retrieve obtain confidence scores for content tags associated with the set of media from the tagging component 134 of FIG. 1. The confidence scorer 304 may obtain content tags and their corresponding confidence scores for each media of the set of media from the tagging component 134. In some examples, the confidence scorer 304 may obtain or retrieve confidence scores for content tags matching the relevant content tags for each candidate event type as determined by the tags matcher 204 of FIG. 2. The confidence scorer 304 may obtain matching content tags from the candidate events determiner 136 or components thereof. Each corresponding candidate score ($CNS_i$) for a content tag in the set of media may be associated with a corresponding correlation score ($COS_i$) for the tag associated with the candidate event type. In this way, the likelihood of a content tag being relevant to the set of media (i.e., confidence score) and the likelihood of the content tag being relevant to the candidate event type (i.e., correlation score) may be associated together for each content tag or relevant content tag found in the media for each candidate event type.

The event candidate scorer 306 is configured to determine an event candidate score for each candidate event type and select the candidate event type with the highest event candidate score as the event type for the set of media. The event candidate scorer 306 may combine the correlation scores from the correlation scorer 302 and the confidence scores from the confidence scorer 304 to determine an overall event candidate score for each candidate event type. The scores may be combined to determine an event candidate score, $ECS_i$, for a candidate event type, $E_i$ as follows:

$$ECS_i = \frac{\sum (COS_i * CNS_i)}{\text{Total Media}}$$

where $COS_i$ is correlation score of a tag (also included in the content tags associated with the a media of the set of media) with the candidate event type, $CNS_i$ is the confidence score of the same tag with the corresponding media in the set of media, and the total media is the total number of media in the set of media. In some examples, the event candidate scores for the candidate event types may be used to rank the candidate event types, with the candidate with the highest score being ranked first, and so on.

The event candidate scorer 306 is configured to generate an event type for the set of media based on the event candidate scores for the candidate event types. The event candidate scorer 306 may obtain the ranked listing of the event candidate scores of the candidate event types. The event candidate scorer 306 may determine the highest scored candidate event type as the event type to present to a user via the client device 110 for the set of media in the digital media gallery 115. The event candidate scorer 306 may obtain the selected event type (i.e., the candidate event type with the highest event candidate score) to present. The event candidate scorer 306 may generate the selected event type via the digital media 115 of the client device 110. In some examples, the event candidate scorer 306 may communicate the selected event type to present to the digital media gallery 115 via network 120. The digital media gallery 115 may then present the selected event type to the user via client device 110.

In some examples, the selected event type may be presented via a user interface of the client device 110 as a title for the set of media within the digital media gallery 115. In some examples, a collage with the set of media and the title including the selected event type may be generated and presented via the client device 110. In another example, an animation with the selected event type as a title and including each of the frames and/or images in the set of media may be generated and presented. In one more example, an album with the selected event type as the title may be generated and presented with the frames and/or images from the set of media included within the album. In this way, the digital media gallery 115 may be organized intelligently to show event types associated with each set of media such that the users may easily perceive the context behind each media set.

The media organization system of the present invention facilitates organization of a media gallery by generating event types for each set of media in the gallery by using a contex3t-based an algorithm to predict an event type being represented in a set of media based on content tags detected in each media of the set of media, and learning correlation scores associated with content tags and corresponding event types. By adopting this system to organize media in a media gallery, an algorithm may be trained to intelligently organize media in a user-friendly and meaningful way by leveraging contextual information present in the media. The present system considers the content of the media itself to accurately organize media by acknowledging and presenting contextual information associated with the media. Further, the present system may allow for accurate and efficient determination of underlying events and/or occasions for a set of digital media by using an algorithm to determine tags relevant to a candidate event type that is specifically selected in order to reduce false negatives and false positives due to outlier images and tags in a set of media.

Figure 4A:
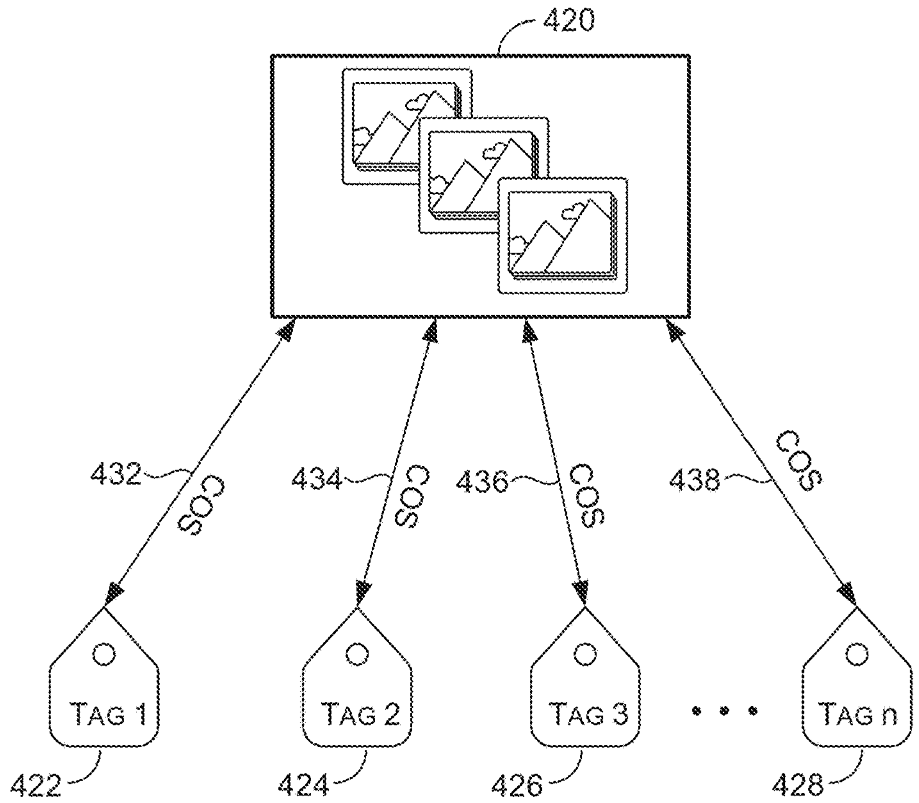
FIG. 4A illustrates an example event type associated with content tags and corresponding correlation scores for each content tag, in accordance with embodiments of the present invention.
Figure 4B:
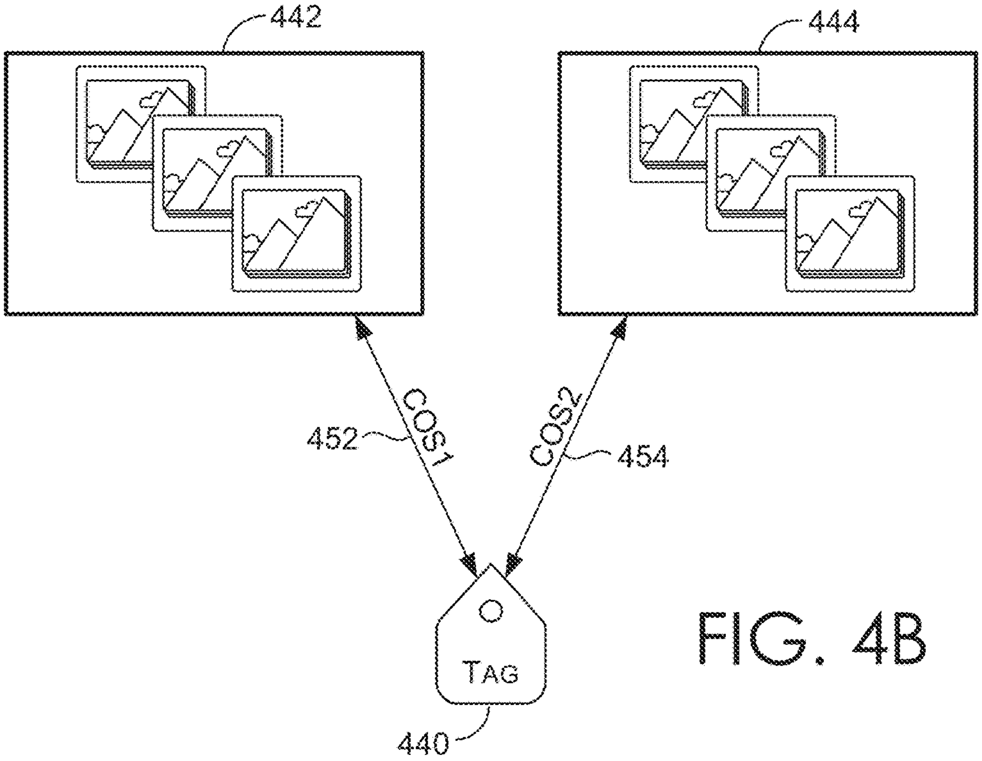
FIG. 4B illustrates of an example content tag associated with different correlation scores for different event types, in accordance with embodiments of the present invention.

Referring now to FIGS. 4A-4B, FIGS. 4A-4B are illustrations of example correlation scores for content tags associated with event types, in accordance with some embodiments of the present disclosure. FIG. 4A illustrates an example event type 420 associated with content tags and corresponding correlation scores for each content tag. For example, the data store 140 may store correlation scores for content tags in relation to event types. For event type 420, content tags 422, 424, 426, and 428 may be associated and stored with their corresponding correlation scores 432, 434, 436, and 238, respectively. Content tag 422 may be associated with the event type 420, and the correlation score 432 may indicate a likelihood of the content tag 420 being relevant to event type 420. Similarly content tags 424, 426, and 428 may be associated with the event type 420, and their corresponding correlation scores 434, 436, and 438 may respectively indicate likelihoods of the content tags being relevant to the event type 420. As can be appreciated, event type 420 may be associated with multiple content tags (e.g., tag 1, tag 2, tag 3, . . . , tag n). Associating content tags with event types via correlation scores may allow for adding contextual information to later aid in contextually organizing media based on event types.

FIG. 4B illustrates an example content tag 440 associated with multiple event types with different correlation scores for different event types. For example, the data store 140 may store correlation scores for content tags in relation to event types. A content tag may be associated with multiple event types, each event type may be correlated with the tag via different correlation scores based on the importance of the tag to the respective event types. For example, content tag 440 may be correlated to event type 442 and event type 444 with correlation score 452 (i.e., COS1) and correlation score 454 (COS1), respectively. Content tag 440 may be associated with the event type 442, and the correlation score 452 may indicate a likelihood of the content tag 420 being relevant to event type 420. Similarly, content tag 440 may be associated with the event type 444, and the corresponding correlation score 454 may indicate likelihood of the content tag 440 being relevant to the event type 444. The correlation score 452 may be different than correlation score 454 based on the relevance of the content tag 440 to the respective event types 442 and 444. Associating a content tags with event types via different correlation scores may allow for adding contextual information to later aid in contextually organizing media based on event types.

Figure 5:
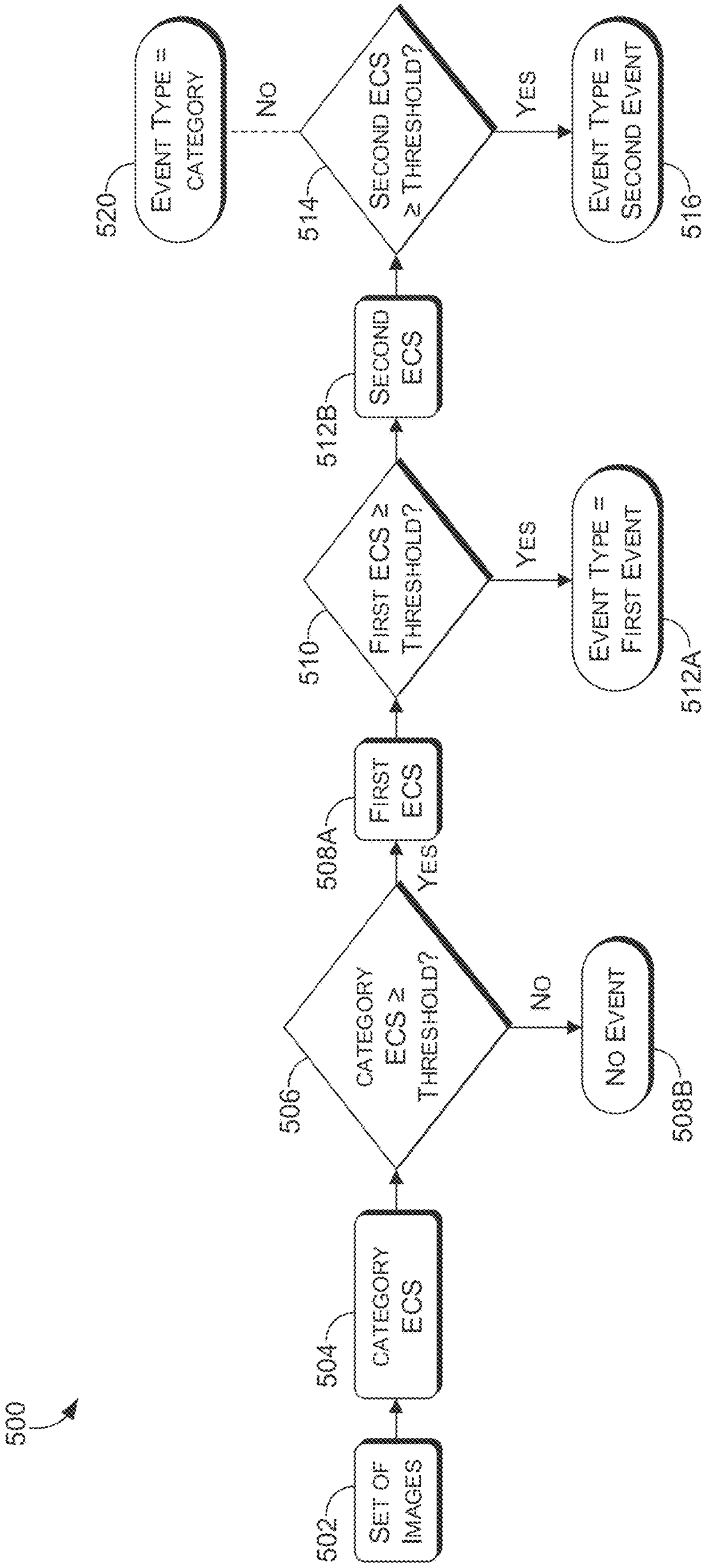
FIG. 5 is a data flow diagram illustrating an example process for context-based digital media organization, in accordance with embodiments of the present invention.

Now referring to FIG. 5, FIG. 5 is an example data flow diagram illustrating an example process 500 for context-based digital media organization, in accordance with some embodiments of the present disclosure. While the media type described with respect to FIG. 5 are images, this is not intended to be limiting, and is for example purposes only. For example, the process 500 may be used to organize any number and types of digital media, such as videos, animations, and combinations thereof, without departing from the scope of the present disclosure.

The process 500 may be used as any components of system 100 to perform the various steps described herein. In some examples, the process 500 may be used as an alternate context-based media organization process than that described with respect to the system 100 of FIG. 1. In some other examples, the process 500 may be used as a validity check against results generated by the process described above with respect to the system 100 of FIG. 1. The process 500 may include generating and/or receiving a set of images 502 from a digital media gallery, such as the digital media gallery 115 of client device 110 of FIG. 1. The set of images 502 may include, without limitation, images derived from any digital imaging system. The set of images 502 may include image data representing an image(s), image data representing frame(s) of a video(s) (e.g., snapshots of video), etc. Where the set of images 502 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats.

The category ECS 504 may use as input the set of images 502 to generate an event candidate score for a category of event types. A category of event types may encompass multiple event types. The categories may be holiday events, life events, travel events, sports events, etc. The media organization system 130 of FIG. 1 may be used to generate an event candidate score for a category of event types. The set of images 502 may be analyzed using the media organization system 130 to determine whether the set represents a category of event types based on content tags associated with the set of images 502. In some examples, a tagging component, such as the tagging component 134 of FIG. 1 may be used to generate content tags for each image of the set of images 502. Each content tag of the set of media 502 may also include a correlation score indicating a likelihood of the content tag being relevant to the respective image. The content tags associated with the set of images 502 may be compared against relevant tags for the category of event types. For example, relevant tags for category of event types "life events" may include party, celebration, birthday, cake, balloon, wedding, groom, bride, gift, candles, decoration, ceremony, anniversary, reception, etc. The event types included in the category of event types "life events" may include, for example, wedding, birthday, anniversary, reception, etc. The relevant tags for the category of event types may be obtained from a data store, such as the data store 140 of FIG. 1, storing learned relevant tags for each category of event types, and event types of the category of event types along with correlation scores for the relevant tags for their respective category or event type. The correlation scores and the confidences scores may be used to determine a category ECS 504 (i.e., category event candidate score) indicating a likelihood of the set of images 502 representing the category of event types.

At decision step 506, the category ECS 504 may be tested against a predetermined threshold score to determine whether the set of images 502 represent the corresponding category of event types. In response to the category ECS 504 being below the pre-determined threshold score, the process 500 may conclude as including no event 508B. In such instances, the process 500 may be repeated for each category of event types until a category ECS for a category of events is equal to or above the pre-determined threshold score. In some examples, a set of images may be determined to represent a category of event types when two or more relevant tags for the category are found to match tags in a threshold percentage of the set of images.

In response to the celebration ECS 504 being equal to or above the pre-determined threshold score, the process 500 may proceed to determine a first ECS 508A for a first event type included in the category of event types. This may be accomplished by determining an event candidate score for a first event type within the category of events. For example, if the category of events is a life event, the first event type may be a "wedding." The first ECS 508A may be calculated based on relevant tags for the first event type and the content tags associated with the set of images 502. A candidate events scorer, such as the candidate events scorer 138 of FIG. 1 may be used to determine the first ECS 508A. The process 500 at step 510 then determines whether the first ECS 508A is above or below a pre-determined threshold score. In response to the first ECS 508A being equal to or above the pre-determined threshold, the event type for the set of images 502 may be determined to be the first event type at step 512A. In such an instance, the process 500 may end and the set of images 502 may be associated with the first event type. The set of images 502 may then be labeled in the digital media gallery as the first event type.

In response to the first ECS 508A being below the pre-determined threshold score, the process 500 may move to determine a second ECS 512B for a second event type included in the category of event types. This may be accomplished by determining an event candidate score for the second event type within the category of events. For example, if the category of events is a life event, the first event type may be a "wedding" and the second event type may be a "birthday." The second ECS 512B may be calculated based on relevant tags for the second event type and the content tags associated with the set of images 502. A candidate events scorer, such as the candidate events scorer 138 of FIG. 130 may be used to determine the second ECS 512B. The process 500 at step 514 determines whether the second ECS 512B is above or below a pre-determined threshold score. In response to the second ECS 512B being equal to or above the pre-determined threshold, event type for the set of images 502 may be determined to be the second event type at step 516. In such an instance, the process 500 may end and the set of images 502 may be associated with the second event type. The set of images 502 may then be labeled in the digital media gallery as the second event type.

In response to the second ECS 512B being below the pre-determined threshold score, the process may continue to determine event candidate scores for the next event types in the category of events. In response to none of the event types in the category of events being determined to be the event type for the set of images 502, the process 500 may conclude, at step 520, with the category of event type set as the event type for the set of images 502 rather than a specific event type. In this way, the present system saves computational power by stopping the analysis once an event candidate score for a particular event type is found to be higher than a threshold as in step 516. The set of images may not be tested against all possible event types within the category of event types. In one embodiment, this approach may be used to validate the results of the overall approach of testing the input media against each candidate event type, as described with respect to the system 100 of FIG. 1. This allows the system to accurately detect events or occasions based on contextual information present in the media.

Figure 6:
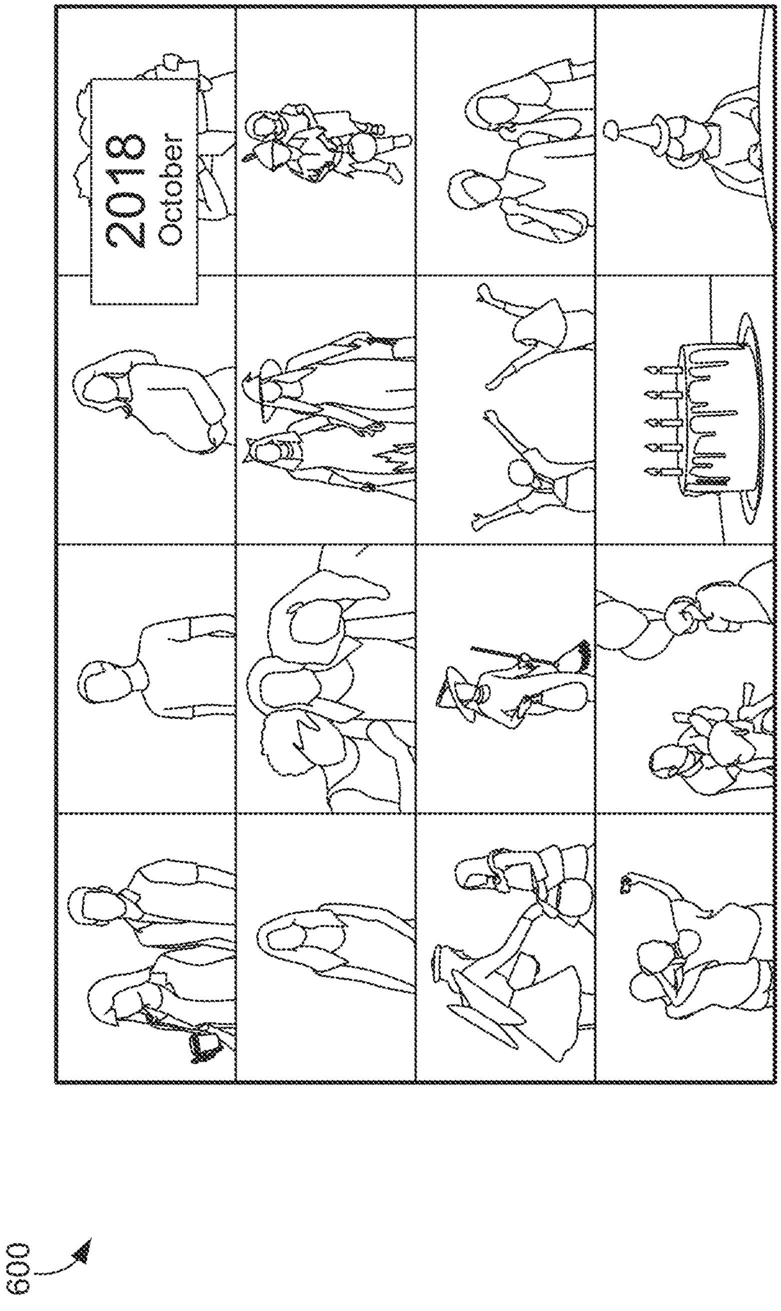
FIG. 6 illustrates an example digital media gallery including an unorganized collection of images, in accordance with embodiments of the present invention.
Figure 7:
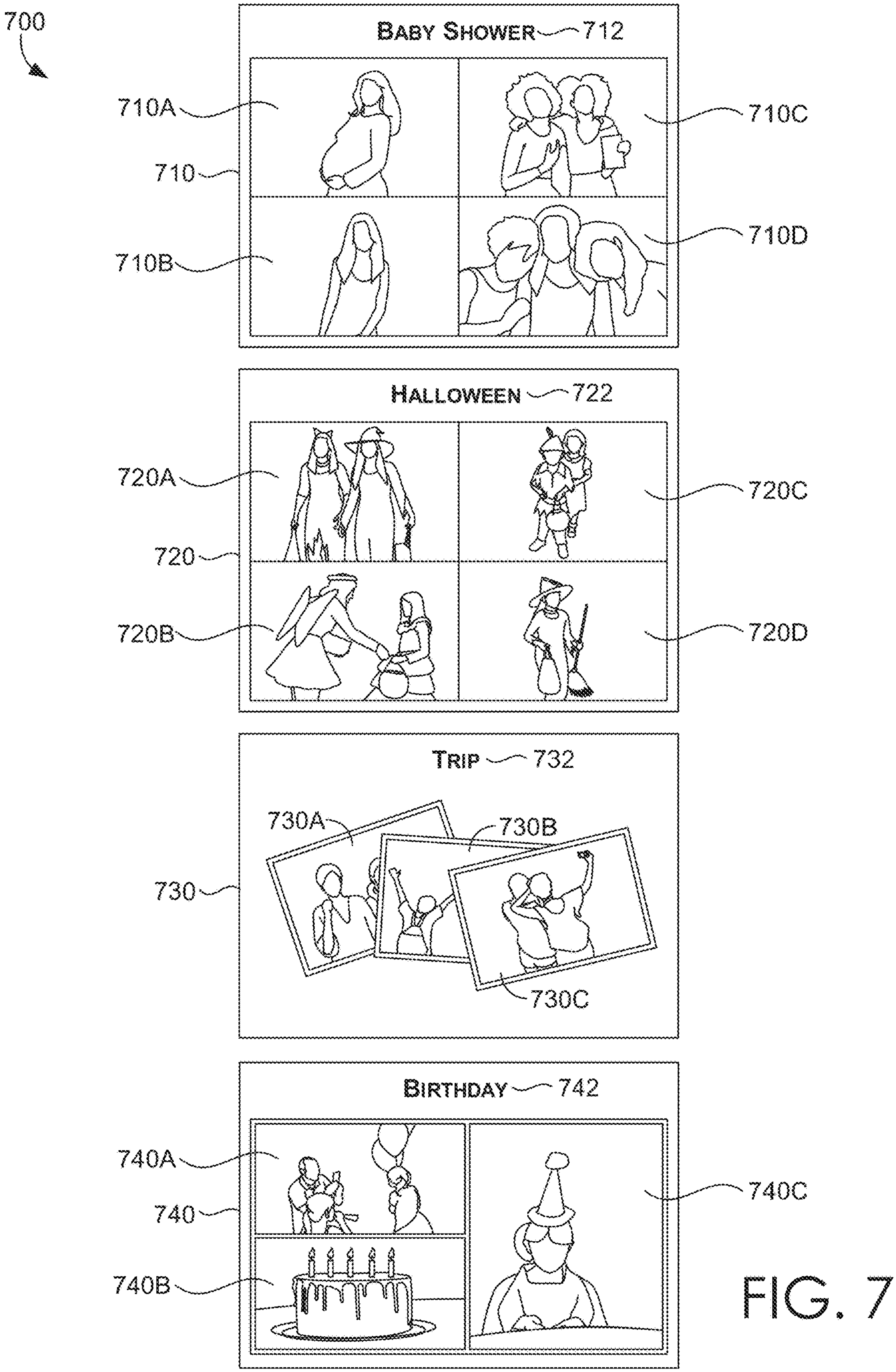
FIG. 7 illustrates an example contextual organization of images from a digital media gallery, in accordance with embodiments of the present invention.

Referring to FIGS. 6-7, FIGS. 6-7 are illustrations of an example digital media gallery contextually organized into event types, in accordance with some embodiments of the present disclosure. FIG. 6 illustrates a digital media gallery 600 including an unorganized collection of images. The digital media gallery 600 includes all images taken or received in January 2018. The images may include images from multiple occasions and/or events during the month of January in year 2018. It may be difficult for a user to delineate any useful information regarding context of the images just from looking at the collection of images.

Referring now to FIG. 7, FIG. 7 illustrates contextual organization 700 of images from a digital media gallery. A digital media gallery 700 may be divided into sets of images (e.g., 710, 720, 730, and 740), and each set of images stored and presented with an event type (e.g., 712, 722, 732, and 742) describing an underlying occasion. For example, the digital media gallery 600 of FIG. 6 may be organized using a media organization system, such as the media organization system 130 of FIG. 3, to separate sets of images belonging to various event types. The set of images 710 may be determined to be representing the event type 712, "Baby Shower," and presented as an album titled "BABY SHOWER" with the images 710A-710D, and so on, included in the album. Similarly, sets of images 720 (e.g., images 720A-720D), 730 (e.g., images 730A-730C), and 740 (e.g., images 740A-740C) may be organized based on detected event types 722, 732, and 742, and presented such that the event types can be easily delineated. Further, a video, animation or collage 740 may also be presented for a set of images, including images 740A-740C, such that the images in the set may be included in the video, animation or collage, with the event type 742, "Birthday," as the title or heading. In this way, the digital media library may be organized in a contextual manner such that users can easily delineate the images or media that represents certain event types versus others.

Exemplary Flow Diagrams

Figure 8:
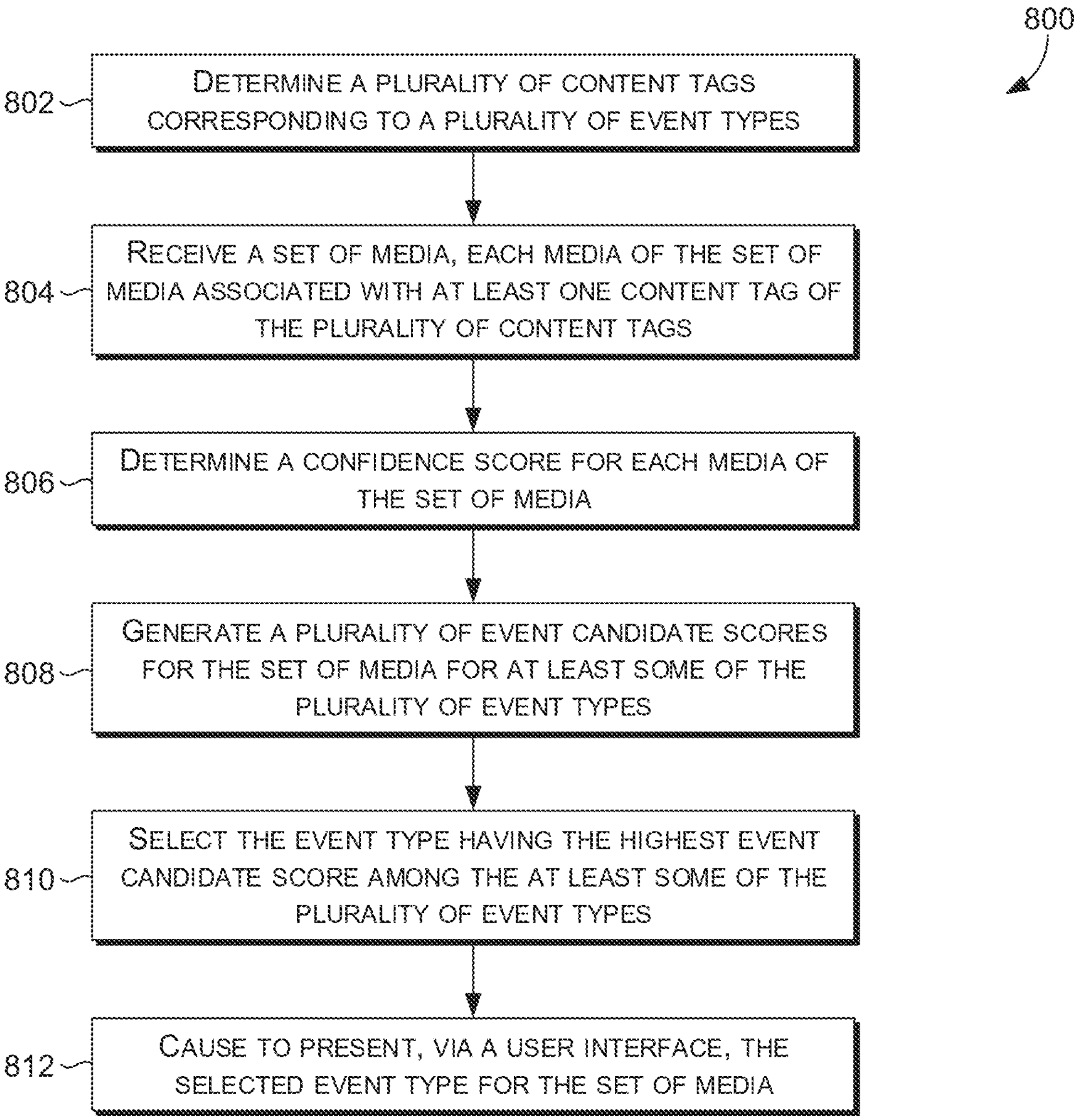
FIG. 8 is a flow diagram showing a method for determining an event type associated with a set of media, in accordance with embodiments of the present invention.
Figure 9:
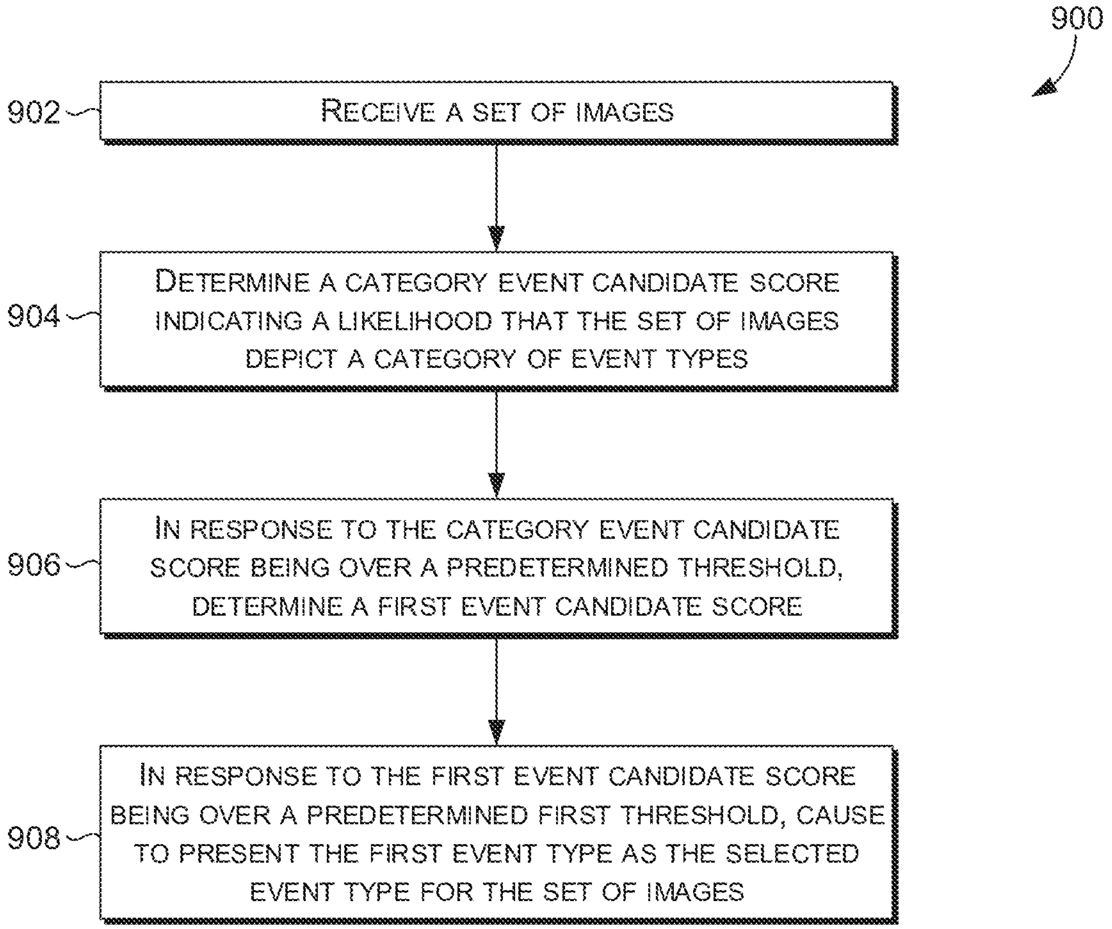
FIG. 9 is a flow diagram showing another method for determining an event type associated with a set of media, in accordance with embodiments of the present invention.

With reference now to FIGS. 8-9, flow diagrams are provided illustrating methods for digital media organization according to the present disclosure. Each block of the methods 800 and 900 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 8, FIG. 8 illustrates a method 800 for determining an event type associated with a set of media, in accordance with embodiments described herein. Initially, at block 802, a plurality of content tags corresponding to a plurality of event types is determined. Each of the content tags includes a correlation score indicating a likelihood that the content tag represents one of the plurality of event types. The content tags corresponding to event types may be determined by a relevant tags determiner, such as the relevant tags determiner 202 of FIG. 2, or a correlation scorer, such as the correlation scorer 302 of FIG. 3. A correlation score may be associated with each content tag for each event type.

At block 804, a set of media is received. Each media of the set of media is associated with at least one of the plurality of content tags. The set of media may be received via a user interface, such as a user interface of the client device 110 of FIG. 1, or a media receiver, such as the media receiver 132 of FIG. 1. Each media may be associated with tags via a tagging component, such as the tagging component 134 of FIG. 1. A media may be associated with multiple tags.

Next, at block 806, a confidence score for each of the media is determined. The confidence score corresponds to a likelihood that the at least one of the plurality of content tags is relevant to the media. A confidence scorer, such as the confidence scorer 304 of FIG. 3, may be used to generate confidence scores for each tag associated with an image. The confidence score corresponding to a likelihood that the tag is relevant to the associated media.

At block 808, a plurality of event candidate scores are generated for the set of media for at least some of the plurality of event types. The event candidate scores are based at least in part on the correlation scores for the plurality of content scores and the confidence scores for each of the media. An event candidate score for an event type of some of the event types may be generated via a candidate events scorer, such as the candidate events scorer 138 of FIG. 1 or an event candidate scorer, such as the event candidate scorer 306 of FIG. 3. The event candidate score may correspond to the likelihood of the set of media corresponding to the event type.

Further, at block 810, the event type with the highest event candidate score among the plurality of event types is selected. A candidate events scorer, such as the candidate events scorer 138 of FIG. 1 or an event candidate scorer, such as the event candidate scorer 306 of FIG. 3 may select an event type as the event type for the set of media as the event type based on the event candidate scores for the plurality of event types.

At block 812, the selected event type for the set of media may be presented. The selected event type may be presented via a user interface of a client device, such as client device 110 of FIG. 1. The selected event type may be presented as a title for the set of media.

Now turning to FIG. 9, FIG. 9 illustrates a method 900 for determining an event type associated with a set of media, in accordance with embodiments described herein. Initially, at block 902, a set of images is received. Each image of the set of images is associated with a plurality of tags. The set of images may be received via a user interface of a device, such as the client device 110 of FIG. 1, or a media receiver, such as the media receiver 132 of FIG. 1. The images may be tagged with tags using a tagging component, such as the tagging component 134 of FIG. 1.

At block 904, a category event candidate score indicating a likelihood that the set of images depict a category of event types is determined. The category event candidate score is determined based on the plurality of tags matching a set of relevant tags for the category of event types, where the category of event types includes a plurality of event types. The category event candidate score may be determined by a candidate events scorer, such as the candidate events scorer 138 of FIG. 1, or an event candidate scorer, such as the event candidate scorer 306 of FIG. 3. The category of event types may a category including multiple event types.

Next, at block 906, in response to the category event candidate score being over a predetermined threshold, a first event candidate score is determined. The first event candidate score corresponds to a likelihood of the set of images belonging to a first event type, the first event type being an event type of the plurality of event types. A first event candidate score may be determined by a candidate events scorer, such as the candidate events scorer 138 of FIG. 1, or an event candidate scorer, such as the event candidate scorer 306 of FIG. 3 based on the plurality of tags associated with the set of images. The first event candidate score may be associated with a first event type of the category of event types.

At block 908, in response to the first event candidate score being over a predetermined first threshold, cause to present the first event type as the selected event type for the set of images. The first event type may be determined to be the event type for the set of images based on the first event candidate score being over a predetermined first threshold by a candidate events scorer, such as the candidate events scorer 138 of FIG. 1. The first event type may be presented via a user interface of a client device, such as the client device 110 of FIG. 1.

Exemplary Operating Environment

Figure 10:
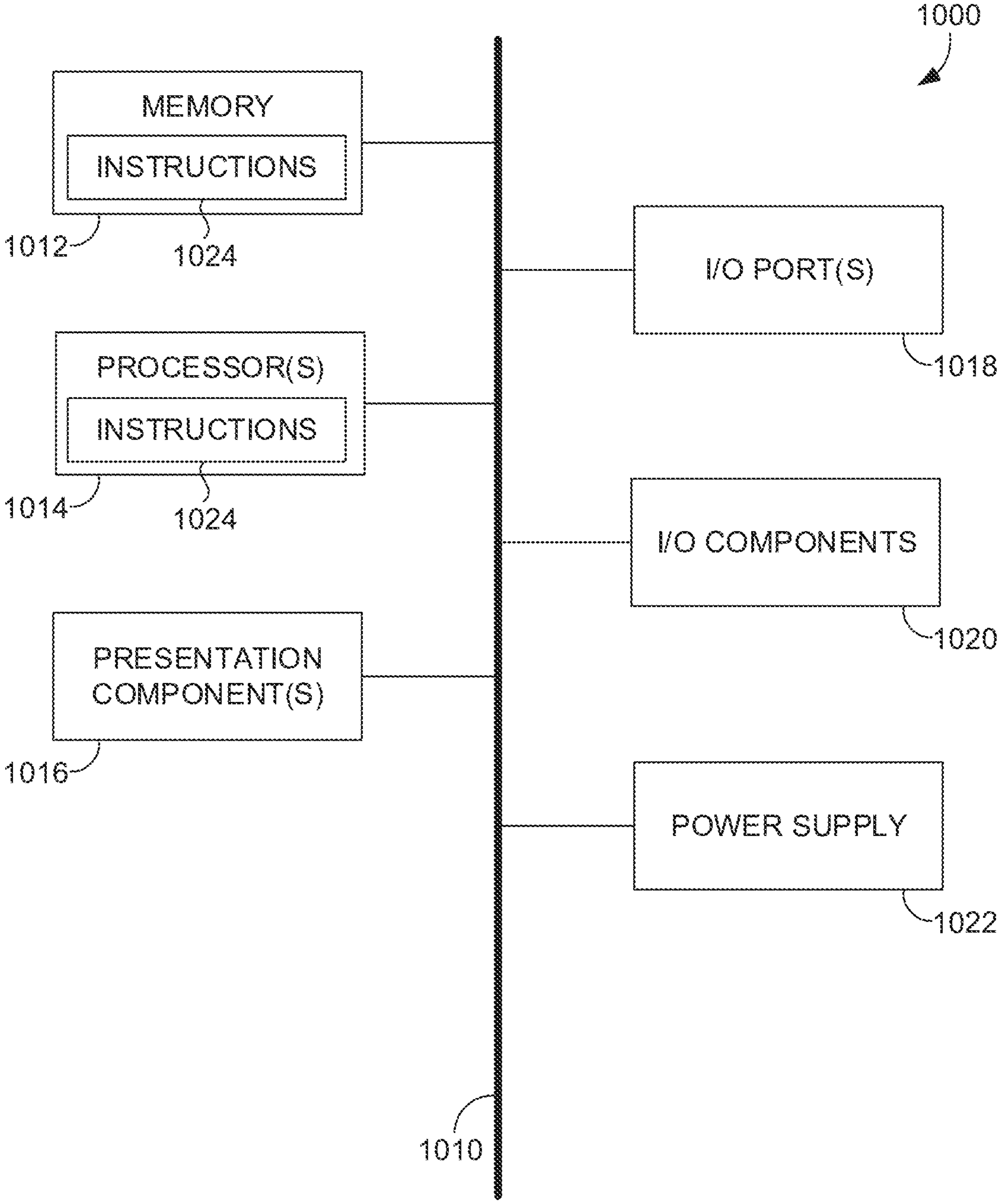
FIG. 10 is a block diagram of an exemplary computing device suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 10 in particular, an exemplary operating environment for implementing embodiments of the present invention is shown and designated generally as computing device 800. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as “workstation,” “server,” “laptop,” “hand-held device,” etc., as all are contemplated within the scope of FIG. 10 and reference to “computing device.”

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media is non-transitory and does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, touch pad, touch screen, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1000. Computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

Embodiments described herein support digital media organization based on a user query. The components described herein refer to integrated components of a digital media organization system. The integrated components refer to the hardware architecture and software framework that support functionality using the digital media organization system. The hardware architecture refers to physical components and interrelationships thereof and the software framework refers to software providing functionality that can be implemented with hardware embodied on a device.

The end-to-end software-based digital media organization system can operate within the digital media organization system components to operate computer hardware to digital media organization system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the digital media organization system components can manage resources and provide services for the digit media organization system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:

accessing a set of digital media;

determining a content tag for each digital media of the set based on content within each respective digital media, the content tag having a corresponding confidence score indicating a likelihood that the content tag is relevant to the respective digital media;

matching the content tag to a relevant content tag retrieved from a data store, the data store storing correlation scores in a hierarchical structure comprising a plurality of categories of event types, each category of event types having a plurality of event types indexed thereunder with corresponding correlation scores for each event type;

determining a category event candidate score for the set of digital media based on the confidence scores and the correlation scores indexed under a category of event types of the plurality of categories of event types in the hierarchical structure;

in response to the category event candidate score exceeding a predetermined threshold, determining a first event candidate score for a first event type of the plurality of event types indexed under the category of event types in the hierarchical structure based on the confidence scores and the correlation scores indexed under the category of event types for the first event type; and in response to the first event candidate score exceeding a predetermined threshold, presenting the set of digital media with an indication of the first event type as the event type for the set of digital media such that the set of digital media is not tested against all of the plurality of event types indexed under the category of event types.

2. The method of claim 1, wherein each digital media of the set is a frame of a video.

3. The method of claim 1, wherein the indication of the event type comprises presenting the event type as a title for the set of digital media.

4. The method of claim 1, wherein a digital media of the set is presented as an animation within the set of digital media and the indication of the event type comprises presenting the event type as a title for the animation.

5. The method of claim 1, further comprising organizing the set of digital media according to the event type with other digital media for the event type, and storing the organized set of digital media.

6. The method of claim 1, generating a collage comprising the set of digital media, wherein the set of digital media is presented within the collage.

7. One or more computer storage media storing computer-useable instructions that, when used by one or more computing devices, cause the one or more computing devices to perform operations comprising:

accessing a set of digital media, each digital media of the set having a content tag that identifies an object within respective digital media, the content tag having a corresponding confidence score indicating a likelihood that the content tag is relevant to the respective digital media;

matching the content tag to a relevant content tag retrieved from a data store, the data store storing correlation scores in a hierarchical structure comprising a plurality of categories of event types, each category of event types having a plurality of event types indexed thereunder with corresponding correlation scores for each event type;

determining a category event candidate score for the set of digital media based on the confidence scores and the correlation scores indexed under a category of event types of the plurality of categories of event types in the hierarchical structure;

in response to the category event candidate score exceeding a predetermined threshold, determining a first event candidate score for a first event type of the plurality of event types indexed under the category of event types in the hierarchical structure based on the confidence scores and the correlation scores indexed under the category of event types for the first event type; and in response to the first event candidate score exceeding a predetermined threshold, presenting the set of digital media with an indication of the first event type as the event type for the set of digital media such that the set of digital media is not tested against all of the plurality of event types indexed under the category of event types.

8. The media of claim 7, wherein the first event candidate score is based on a total number of digital media included in the set of digital media.

9. The media of claim 7, wherein the indication of the event type is presented as a title for the set of digital media.

10. The media of claim 7, wherein the set of digital media is presented as an animation and the indication is presented as a title for the animation.

11. The media of claim 7, wherein the set of digital media is presented as part of an album of digital media for the event type having a title identifying the event type.

12. The media of claim 7, wherein the set of digital media is presented as part of a collage of digital media for the event type.

13. A system comprising:

at least one processor; and one or more computer storage media storing instructions thereon that, when executed by the at least one processor, cause the at least one processor to perform a method comprising:

tagging each digital media of a set of digital media with a content tag that identifies an object within respective digital media, wherein the content tag has a corresponding confidence score indicating a likelihood that the content tag is relevant to the respective digital media;

identifying a relevant content tag retrieved from a data store using the content tag, the data store storing correlation scores in a hierarchical structure comprising a plurality of categories of event types, each category of event types having a plurality of event types indexed thereunder with corresponding correlation scores for each event type;

determining a category event candidate score for the set of digital media based on the confidence scores and the correlation scores indexed under a category of event types of the plurality of categories of event types in the hierarchical structure;

in response to the category event candidate score exceeding a predetermined threshold, determining a first event candidate score for a first event type of the plurality of event types indexed under the category of event types in the hierarchical structure based on the confidence scores and the correlation scores indexed under the category of event types for the first event type; and in response to the first event candidate score exceeding a predetermined threshold, generating a presentation of the set of digital media that includes an indication of the first event type as the event type for the set of digital media such that the set of digital media is not tested against all of the plurality of event types indexed under the category of event types.

14. The system of claim 13, further comprising generating a set of media that includes the set of digital media and other digital media, the set of media generated by including the other digital media in the set based on location stamps corresponding to the other digital media relative to a location stamp corresponding to the set of digital media.

15. The system of claim 13, further comprising ranking event types, wherein the event type is selected from the ranked event types.

16. The system of claim 13, wherein each digital media of the set is an image having the object.

17. The system of claim 13, wherein the indication of the event type is a title for the set of digital media within the presentation.

18. The system of claim 13, wherein the presentation comprises presenting the set of digital media as an animation, and the indication of the event type is provided as a title to the presentation.

19. The system of claim 13, wherein the presentation comprises a collage, and the collage includes the set of digital media with other digital media corresponding to the event type.

20. The system of claim 13, wherein the presentation presents an album of digital media for the event type.

* * * * *